United States Patent
Fujii

(10) Patent No.: US 9,555,722 B2
(45) Date of Patent: Jan. 31, 2017

(54) SEAT OCCUPANCY DETERMINATION APPARATUS

(71) Applicant: AISIN SEIKI KABUSHIKI KAISHA, Kariya-shi (JP)

(72) Inventor: Hiroyuki Fujii, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 959 days.

(21) Appl. No.: 13/771,591

(22) Filed: Feb. 20, 2013

(65) Prior Publication Data

US 2013/0218486 A1 Aug. 22, 2013

(30) Foreign Application Priority Data

Feb. 22, 2012 (JP) .................................. 2012-036432

(51) Int. Cl.
*B60N 2/00* (2006.01)
*B60R 22/48* (2006.01)

(52) U.S. Cl.
CPC .............. *B60N 2/002* (2013.01); *B60R 22/48* (2013.01); *B60R 2022/4816* (2013.01); *B60R 2022/4858* (2013.01)

(58) Field of Classification Search
CPC ......... B06G 19/08; B60N 2/002; B60R 22/48; B60R 2022/4816; B60R 2022/4858
See application file for complete search history.

(56) References Cited

U.S. PATENT DOCUMENTS

| 2005/0131605 A1* | 6/2005 | Nakamoto | B60R 21/01516 701/45 |
| 2011/0010037 A1* | 1/2011 | Inayoshi | B60N 2/002 701/31.4 |
| 2011/0010038 A1 | 1/2011 | Inayoshi et al. | |

FOREIGN PATENT DOCUMENTS

| JP | 9-207638 | 8/1997 |
| JP | 3991740 | 8/2007 |

* cited by examiner

*Primary Examiner* — Mohamed Charioui
*Assistant Examiner* — Catherine Rastovski
(74) *Attorney, Agent, or Firm* — Oblon, McClelland, Maier & Neustadt, L.L.P.

(57) ABSTRACT

A seat occupancy determination apparatus includes a seat belt attachment detection portion, a first and a second load detection sensors, a front-rear load sum computing portion, a front-rear load difference computing portion, a memory portion, an adult possibility determination portion, and a child safety seat determination portion determining a vehicle seat determined as possibly occupied by an adult is occupied by a child safety seat in a case where a first predetermined amount increase condition satisfies by a front-rear load difference value within a time range between a time of engagement and a first time point increases by a first predetermined amount or more from the value at the first time point or earlier and a second predetermined amount decrease condition satisfies by the front-rear load difference value decreases by a second predetermined amount or more within a time range between the time of engagement and a second time point.

4 Claims, 7 Drawing Sheets

Situation where adult is occupying vehicle seat

Situation where child safety seat is strapped into vehicle seat

First flow chart

Third flow chart

SEAT OCCUPANCY DETERMINATION APPARATUS

CROSS REFERENCE TO RELATED APPLICATIONS

This application is based on and claims priority under 35 U.S.C. §119 to Japanese Patent Application 2012-036432, filed on Feb. 22, 2012 the entire content of which is incorporated herein by reference.

TECHNICAL FIELD

This disclosure generally relates to a seat occupancy determination apparatus.

BACKGROUND DISCUSSION

In recent years, in order to improve performance of various safety devices, for example, of a seat belt and an airbag provided on a vehicle, operations of such safety devices may be controlled in accordance with a weight of an occupant seated on a seat of the vehicle. For example, in a case where the occupant seated on the seat does not wear the seat belt, a warning is generally displayed for indicating that the seat belt is not fastened after the seating of the occupant is detected. In addition, according to regulations in the North America, an airbag is required to be deployed at a vehicle crash in a state where an adult is seated on a passenger seat. In a case where a child safety seat is installed on the passenger seat to face the back of the vehicle so that an infant or a child faces a driver of the vehicle, an airbag deployment is restricted because an impact of the air bag deployment has an adverse effect on the infant or the child. An adult occupant is determined with reference to a weight of a small body size adult female. A separate reference is defined for determining an infant or a child. Accordingly, correctly and appropriately determining the weight of the occupant is extremely important for a safety aspect.

JPH09-207638A, hereinafter referred to as Reference 1, discloses an occupancy detection apparatus that determines whether or not an occupant is seated on a seat by detecting a load applied on the seat. The occupancy detection apparatus is provided with two load sensors at a multiple number of seat attachment portions for obtaining a load sum value of the two load sensors to determine whether or not an occupant is seated on the seat. Normally, four seat attachment portions are provided, however, the occupancy detection apparatus disclosed in Reference 1 requires minimum two locations of the seat attachment portions so that an occupancy detection apparatus having a simple configuration as a whole and advantageous in reducing cost may be provided.

JP3991740B, hereinafter referred to as Reference 2, discloses an occupancy detection apparatus for determining whether an occupant seated on a seat is an adult or a child. The occupancy detection apparatus disclosed in Reference 2 includes first load sensors and second load sensors for detecting a load applied on the seat at a portion of the seat near a buckle of a seat belt device and a portion of the seat in the opposite direction to where the buckle is provided. The occupancy detection apparatus also includes a detection means for detecting that a tongue plate is inserted into the buckle and a determination means that determines the occupant as an adult in a case where a total load calculated from values detected by the first load sensors and the second load sensors equals to or more than a predetermined threshold value. In addition, the determination means determines that the occupant is an infant or a child even on a condition where the total load equals to or more than the threshold value in a case where a history of a difference between the values detected by the first load sensors and the second load sensors indicates an increase to a value more than a predetermined value and furthermore a detected value by the first load sensors indicates an increase within a time range around a time point where the tongue plate has inserted. Accordingly, the occupancy detection apparatus disclosed in Reference 2 may prevent a false determination of the occupant as an adult in a case where the occupant seated on the seat is actually an infant or a child having a weight slightly lower than the threshold value and the seat belt of the infant or the child is fastened by a different passenger. Note that, according to Reference 2, two first load sensors and two second load sensors are provided on the four seat attachment portions in order to detect the total load.

The occupancy detection apparatus disclosed in Reference 1 is provided with a minimum number of load sensors in order to reduce cost and weight of the apparatus. Accordingly, the occupancy detection apparatus may determine whether or not an occupant is on a seat, however, may provide difficulty on distinguishing the occupant on the seat from an adult and a child safety seat. For example, the occupant on the seat is difficult to distinguish from an adult and a child safety seat in a case where the child safety seat is retained to the seat by engaging a tongue plate of a seat belt device with a buckle. A load sensor provided at a location near and beneath the tongue plate receives a large load applied from a person attempting to attach the child safety seat, the person who applies a part of a weight of the self on the child safety seat to engage the tongue plate with the buckle. As a result, the load sum value detected by the load sensors may become larger than the threshold value for determining the occupant as an adult, which may lead to a false determination of the child safety seat as an adult.

The occupancy detection apparatus disclosed in Reference 2 takes into account of a temporary increase of the load due to a seat belt attachment process so that the occupancy detection apparatus may distinguish the occupant on the seat from an adult and a child safety seat with high accuracy. Nevertheless, providing a load sensor to each of the four seat attachment portions results in increasing cost and weight of the apparatus.

A need thus exists for a seat occupancy determination apparatus, which is not susceptible to the drawback mentioned above

SUMMARY

A seat occupancy determination apparatus includes a seat belt attachment detection portion detecting attachment and detachment of a tongue plate and a buckle of a seat belt device, a first load detection sensor and a second load detection sensor arranged spaced-apart from each other in frontward and rearward direction beneath a portion of a vehicle seat in a direction where the buckle is provided, the first load detection sensor and the second load detection sensor independently detecting a part of a load that is applied on the vehicle seat, a front-rear load sum computing portion calculating a front-rear load sum value by adding a first load value detected by the first load detection sensor and a second load value detected by the second load detection sensor, a front-rear load difference computing portion calculating a front-rear load difference value by subtracting the first load value from the second load value, a memory portion storing the calculated front-rear load sum value and the calculated front-rear load difference value, an adult possibility determination portion determining the vehicle seat is possibly occupied by an adult seating on the vehicle seat in a case where the front-rear load sum value at a first time point or earlier relative to the first time point is larger than an adult determination threshold value where the first time point defines a point in time going back by a first predetermined length of time from a time point of engagement detected as a point in time where the tongue plate engages with the buckle, and a child safety seat determination portion determining the vehicle seat determined as possibly occupied by an adult seating on the vehicle seat in the adult possibility determination portion is occupied by a child safety seat strapped into the vehicle seat in a case where a first predetermined amount increase condition satisfies and a second predetermined amount decrease condition satisfies where the first predetermined amount increase condition is a condition where the front-rear load difference value within a time range between the time point of engagement and the first time point including the time point of engagement increases by an amount equal to or more than a first predetermined amount from the front-rear load difference value at the first time point or earlier relative to the first time point and the second predetermined amount decrease condition is a condition where the front-rear load difference value increased by the amount equal to or more than the first predetermined amount decreases by an amount equal to or more than a second predetermined amount within a time range between the time point of engagement and a second time point including the time point of engagement where the second time point defines a point in time elapsed by a second predetermined length of time from the time point of engagement.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
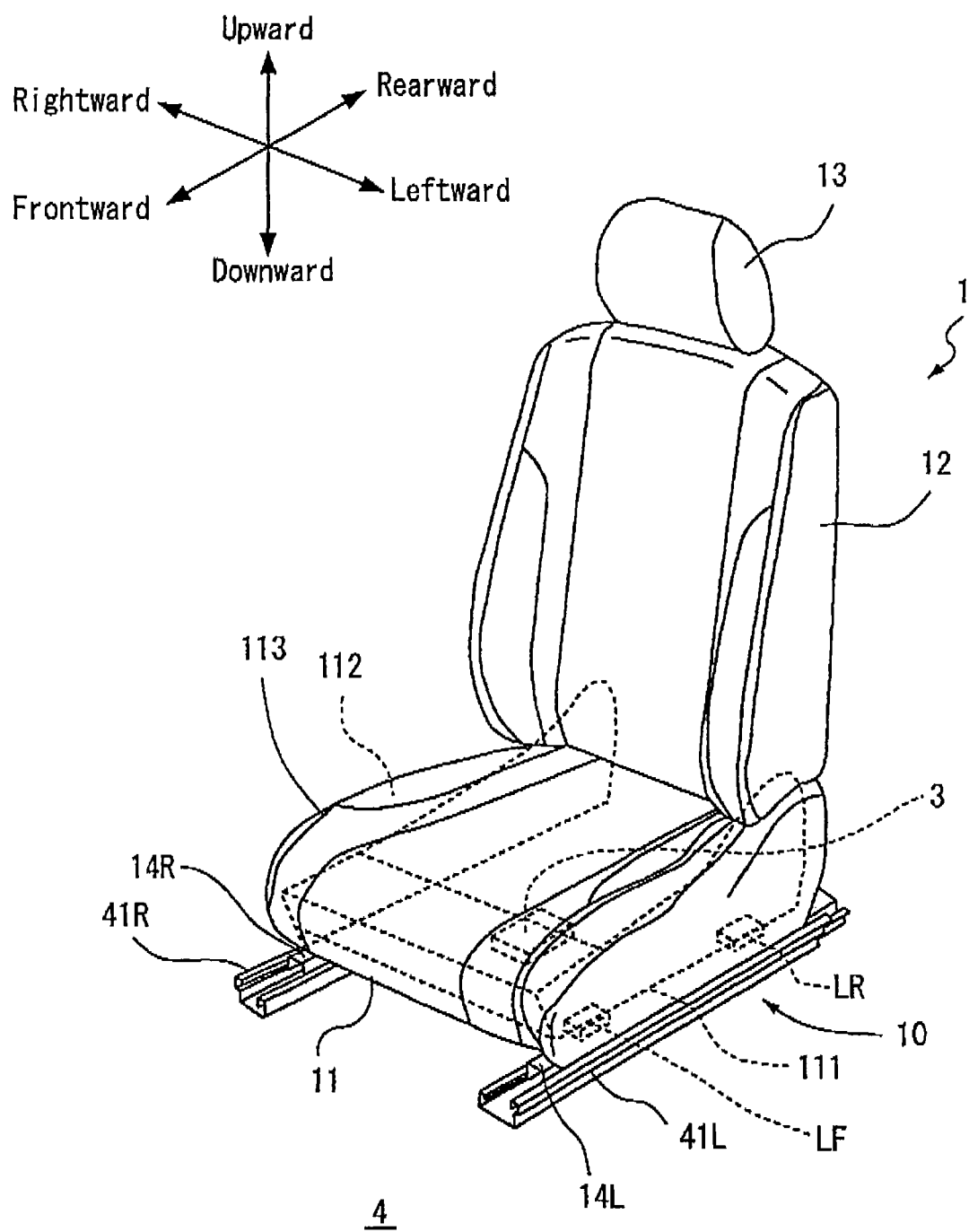
FIG. 1 is a perspective view of a vehicle seat provided with a seat occupancy determination apparatus according to an embodiment.

A seat occupancy determination apparatus 10 according to an embodiment, which is arranged on a vehicle seat 1, is described referring to drawings. Each of directions in frontward, rearward, rightward, leftward, upward and downward is as indicated in FIG. 1. Each of the directions are a direction relative to a passenger seated on the vehicle seat 1 viewing a vehicle provided with the vehicle seat 1. The vehicle arranged with the seat occupancy determination apparatus 10 according to the embodiment is a vehicle with a steering wheel on the left side and the vehicle seat 1 arranged with the seat occupancy determination apparatus 10 is a passenger seat.

As FIG. 1 illustrates, the vehicle seat 1, which is a passenger seat, includes a seat cushion 11, which is where a passenger seats, and a seat back 12, which is where the back of the passenger rests. The seat back 12 is attached to a rear end portion of the seat cushion 11 such that the seat back 12 pivots thereat in directions of front and rear. A head restraint 13 for supporting a head portion of the passenger on the seat is attached to an upper end portion of the seat back 12.

The seat cushion 11 includes a seat frame 111 having a rectangular shape with one side open in a top view, a pad member 112 arranged upward of the seat frame 111, and a cover 113 covering the surfaces of the pad member 112. A pair of upper rails 14L, 14R, which are arranged spaced-apart in directions of left and right to retain the seat frame 111, are fixed to the surface in the downward direction of the seat frame 111 at four retaining portions arranged at front-right, front-left, rear-right and rear-left. The upper rails 14L, 14R engage to a pair of lower rails 41L, 41R fixed to a vehicle floor 4 such that each of the upper rails 14L, 14R may slide in front-rear directions on a lower rail 41L, 41R corresponding to each of the upper rails 14L, 14R. Accordingly, the vehicle seat 1 may move in the front-rear directions on the vehicle floor 4 so that the passenger seated on the seat may fix the vehicle seat 1 at a selected position.

Figure 3:
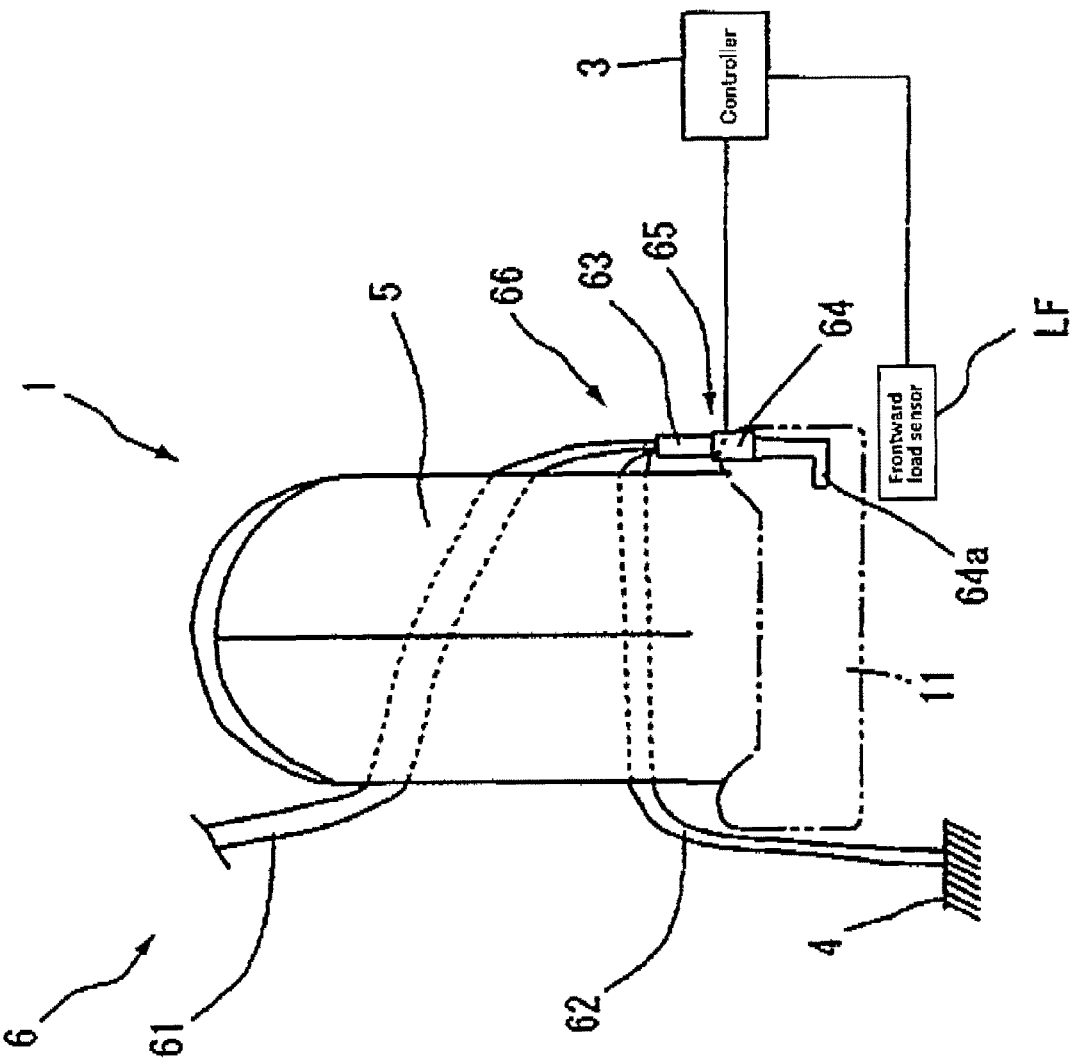
FIG. 3 is a simplified drawing illustrating how a child safety seat is strapped into the vehicle seat.

As in FIG. 3, which illustrates a child safety seat 5 strapped into the vehicle seat 1 viewed from front, the vehicle seat 1 is equipped with a seat belt device 6. The seat belt device 6 includes a shoulder strap 61 and a lap strap 62 connected to each other by one end of each of the shoulder strap 61 and the lap strap 62 connecting to a tongue plate 63. The seat belt device 6 also includes a buckle 64 that serves as a buckle switch 65, which serves as a seat belt attachment detection portion, by engaging and disengaging with the tongue plate 63. A pillar arranged rightward of the vehicle seat 1 is equipped with a retractor, which is a winding device. An upper end of the shoulder strap 61 is connected to the retractor such that the shoulder strap 61 may be pulled out from the pillar against the winding force of the retractor.

Other end of the lap strap 62 is fixed to the vehicle floor 4 at rightward of the vehicle seat 1. The buckle 64 includes a retaining portion 64a, which connects to a left side rearward portion of the vehicle seat 1. The buckle 64 is retained such that an opening for inserting the tongue plate 63 into is arranged to open in the upward direction. The tongue plate 63 connecting the shoulder strap 61 and the lap strap 62 is inserted into the opening of the buckle 64 to engage with the buckle 64 and retained thereat. Hereinafter, the shoulder strap 61 together with the lap strap 62 may be referred to as a seat belt 66.

Figure 2:
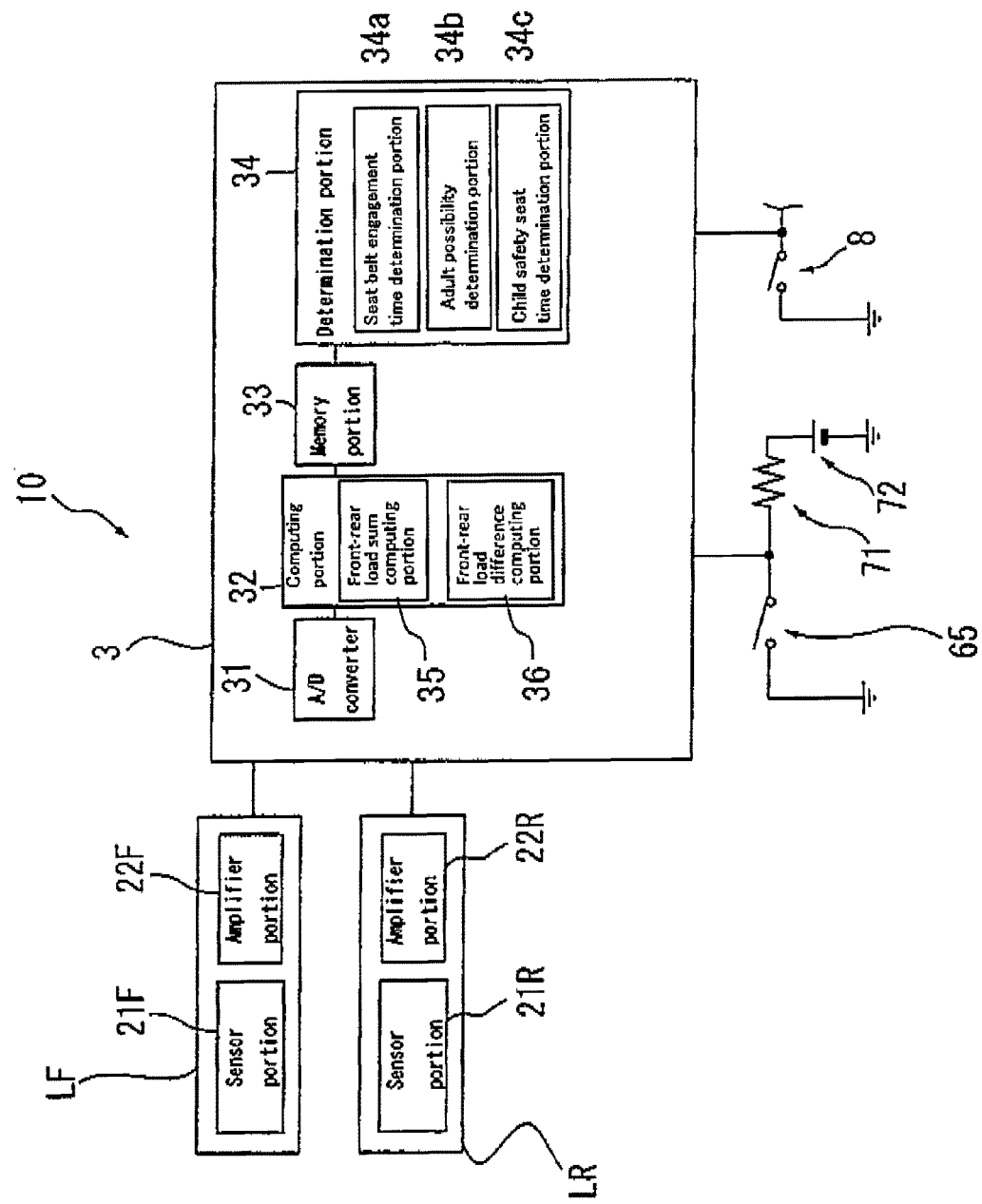
FIG. 2 is a block diagram illustrating a general concept of the seat occupancy determination apparatus according to the embodiment.

As FIG. 2 illustrates, in a state where the tongue plate 63 and the buckle 64, each of which is a component of the seat belt device 6, are disengaged, the buckle switch 65 is in an open state, which is a state where the buckle switch 65 is OFF. In a state where the tongue plate 63 engages with the buckle 64, the buckle switch 65 is in a close state, which is a state where the buckle switch 65 is ON, the state where a controller 3 detects that the seat belt device 6 is attached.

The seat occupancy determination apparatus 10 according to the embodiment will be described next referring to FIGS. 1 through 3. The seat occupancy determination apparatus 10 determines whether the vehicle seat 1 is occupied with an adult seating on the vehicle seat 1 or with a child safety seat strapped into the vehicle seat 1. The seat occupancy determination apparatus 10 includes the buckle switch 65, which serves as the seat belt attachment detection portion, as shown in FIGS. 2 and 3, a frontward load sensor LF, which serves as a first load detection sensor, a rearward load sensor LR, which serves as a second load detection sensor, and the controller 3.

The frontward load sensor LF and the rearward load sensor LR are provided as a pair arranged with a predetermined distance between each other in frontward and rearward direction of the vehicle seat 1 beneath leftward end portion of the vehicle seat 1, which is an end portion of the vehicle seat 1 in a same direction as where the buckle 64 is arranged. More specifically, the frontward load sensor LF and the rearward load sensor LR are arranged between the seat frame 111 and the upper rail 14L, which is one of the pair of upper rails 14L, 14R arranged at a leftward position of the vehicle seat 1. As FIG. 1 illustrates, the frontward load sensor LF is arranged at a frontward position relative to a middle point of the seat cushion 11 in the frontward and rearward direction. The rearward load sensor LR is arranged at a position rearward relative to the middle point of the seat cushion 11 in the frontward and rearward direction.

Each of the frontward load sensor LF and the rearward load sensor LR is a load sensor formed with a strain gauge or a similar device. A frontward load value fLF, which serves as a first load value, of the frontward load sensor LF and a rearward load value fLR, which serves as a second load value, of the rearward load sensor LR are reset to zero through a zero-set process on the horizontally placed vehicle before the vehicle leaves a factory. Each of the frontward load sensor LF and the rearward load sensor LR detects a load that applies in the downward direction on the seat cushion 11 in a case similar to where a passenger seats on the vehicle seat 1, the child safety seat 5 is strapped into the vehicle seat 1, or a luggage is placed on the vehicle seat 1. Note that with the seat occupancy determination apparatus 10 according to this disclosure, a type, a model, or a principle of detection of each of the frontward load sensor LF and the rearward load sensor LR is not limited to a specific one.

The frontward load sensor LF detects the frontward load value fLF, which is a size of a load a frontward left portion of the seat cushion 11 receives. Similarly, the rearward load sensor LR detects the rearward load value fLR, which is a size of a load a rearward left portion of the seat cushion 11 receives.

As FIG. 2 illustrates, the frontward load sensor LF includes a sensor portion 21F and an amplifier portion 22F and the rearward load sensor LR includes a sensor portion 21R and an amplifier portion 22R. The amplifier portions 22F, 22R amplify detection signals generated in the sensor portions 21F, 21R. Each of the sensor portions 21F, 21R is formed with a Wheatstone bridge circuit having four strain gauges.

Each of the frontward load sensor LF and the rearward load sensor LR connects to the controller 3. The controller 3 includes an A/D converter 31, a computing portion 32, a memory portion 33, and a determination portion 34. The A/D converter 31 converts an analog detection signal detected by either the frontward load sensor LF or the rearward load sensor LR into a digital signal. The computing portion 32 performs calculations based on the detected signals. The memory portion 33 stores various data including results of calculations calculated in the computing portion 32 to be used for determining a state of seat occupancy. Based on the results of calculations calculated in the computing portion 32 and other information, the determination portion 34 determines whether the vehicle seat 1 is occupied by the child safety seat 5 strapped into the vehicle seat 1 or an adult seating on the vehicle seat 1.

The computing portion 32 includes a front-rear load sum computing portion 35 and a front-rear load difference computing portion 36 of the seat occupancy determination apparatus 10 according to this disclosure. The front-rear load sum computing portion 35 calculates a front-rear load sum value (fLF+fLR) of the seat occupancy determination apparatus 10 according to this disclosure by adding the frontward load value fLF, which serves as the first load value, detected by the frontward load sensor LF, which serves as the first load detection sensor, and the rearward load value fLR, which serves as the second load value, detected by the rearward load sensor LR, which serves as the first load detection sensor. The front-rear load difference computing portion 36 calculates a front-rear load difference value (fLR−fLF) of the seat occupancy determination apparatus 10 according to this disclosure by subtracting the frontward load value fLF, which serves as the first load value, detected by the frontward load sensor LF from the rearward load value fLR, which serves as the second load value, detected by the rearward load sensor LR.

The calculated front-rear load sum values (fLF+fLR) and the calculated front-rear load difference values (fLR−fLF) are temporarily stored in the memory portion 33. The memory portion 33 sends out the front-rear load sum values (fLF+fLR) and the front-rear load difference values (fLR−fLF) to the determination portion 34 as necessary. The memory portion 33 stores the calculated front-rear load sum values (fLF+fLR) and calculated the front-rear load difference values (fLR−fLF) sequentially. A total number of data of the front-rear load sum values (fLF+fLR) and the front-rear load difference values (fLR−fLF) to be stored in the memory portion 33 may be set to a selected number. In the seat occupancy determination apparatus 10 according to the embodiment, for example, the memory portion 33 is set to store a data every 100 millisecond. Oldest data is erased when a new data is stored. On a steady basis, the memory portion 33 stores one to two seconds amount of data, which in other words is approximately ten to twenty data. A length of time the memory portion 33 stores is not limited to the aforementioned length of time and may be set to a selected length of time. The memory portion 33 may independently store the frontward load values fLF obtained by the frontward load sensor LF and the rearward load values fLR obtained by the rearward load sensor LR instead of storing the data as the front-rear load sum values (fLF+fLR) and the front-rear load difference values (fLR−fLF), which are results of calculations. The front-rear load sum computing portion 35 and the front-rear load difference computing portion 36 may obtain the frontward load values fLF and the rearward load values fLR as necessary to calculate the front-rear load sum values (fLF+fLR) or the front-rear load difference values (fLR−fLF) and send results to the determination portion 34.

Figure 5:
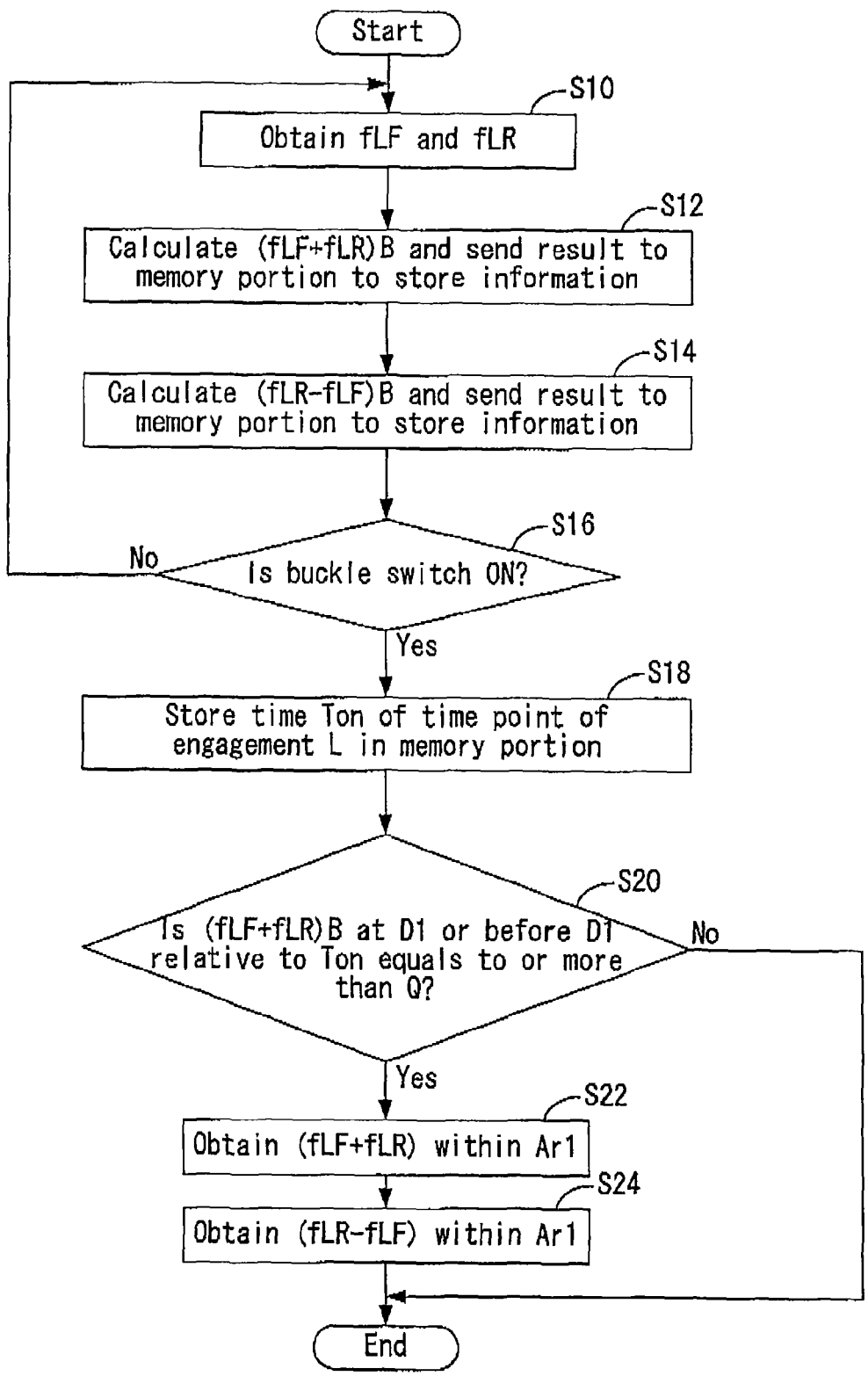
FIG. 5 is a first flow chart describing a process of determining whether an adult is seated on the vehicle seat or a child safety seat is strapped into the seat.

An adult determination threshold value Q, which is indicated in FIG. 5, is a value selected in advance and provided in the memory portion 33. The adult determination threshold value Q is a threshold value for comparing with the front-rear load sum value (fLF+fLR) to determine whether the vehicle seat 1 is occupied by an adult seating on the vehicle seat 1 or by the child safety seat 5 strapped into the vehicle seat 1. More specifically, in a case where the front-rear load sum value (fLF+fLR) is equal to or more than the adult determination threshold value Q, the vehicle seat 1 is determined as occupied by an adult seating on the vehicle seat 1. In a case where the front-rear load sum value (fLF+fLR) is less than the adult determination threshold value Q, the vehicle seat 1 is determined as occupied by the child safety seat 5 strapped into the vehicle seat 1. Any number may be selected as the adult determination threshold value Q. A favorable value of the adult determination threshold value Q is a substantially middle value between an average value of actually measured and evaluated front-rear load sum values (fLF+fLR)Ad in a state where the vehicle seat 1 is occupied by an adult seating on the vehicle seat 1 and an average value of actually measured and evaluated front-rear load sum values (fLF+fLR)Ch in a state where the vehicle seat 1 is occupied by the child safety seat 5 strapped into the vehicle seat 1, where each of the actually measured and evaluated front-rear load sum values (fLF+fLR)Ad, (fLF+fLR)Ch are measured while the vehicle is horizontally positioned. Accordingly, in an ordinary case and in most cases, a correct and steady determination of whether the vehicle seat 1 is occupied by an adult seating on the vehicle seat 1 or by the child safety seat 5 strapped into the vehicle seat 1 is provided. The substantially middle value between the average value of the actually measured and evaluated front-rear load sum values (fLF+fLR)Ad and the average value of the actually measured and evaluated front-rear load sum values (fLF+fLR)Ch is an example of the adult determination threshold value Q. The adult determination threshold value Q may be any selected value as long as the adult determination threshold value Q may determine whether the vehicle seat 1 is occupied by an adult seating on the vehicle seat 1 or by the child safety seat 5 strapped into the vehicle seat 1. As in the seat occupancy determination apparatus 10 according to the embodiment, another threshold value, for example, a child safety seat determination threshold value W, for determining that the child safety seat 5 is strapped into the vehicle seat 1 may be defined in addition to the adult determination threshold value Q in order to determine whether the vehicle seat 1 is occupied by an adult seating on the vehicle seat 1 or by the child safety seat 5 strapped into the vehicle seat 1.

The determination portion 34 includes a seat belt engagement time determination portion 34*a*, an adult possibility determination portion 34*b*, and a child safety seat determination portion 34*c*. The seat belt engagement time determination portion 34*a* detects a time point of engagement L, which is a point in time where the tongue plate 63 engages with the buckle 64 and the buckle switch 65 is turned ON from the state where the buckle switch 65 is turned OFF. As FIG. 2 illustrates, the buckle switch 65 connects to the controller 3. A battery 72 of the vehicle connects to the buckle switch 65 via a DC resistance 71. In a state where the buckle switch 65 is in the open state, the DC resistance 71 is supplied with no electricity so that the controller 3 detects the terminal voltage of a positive terminal of the battery 72, which is a voltage condition referred to as high. In a state where the buckle switch 65 is in the close state, the DC resistance 71 is supplied with electricity so that the controller 3 detects a lowering of the voltage due to the effect of the DC resistance 71, which is a voltage condition referred to as low. Accordingly, the controller 3 detects that the seat belt device 6 is in the attached state, which is the state where the buckle 64 engages with the tongue plate 63. Furthermore, an ignition switch 8 of the vehicle connects to the controller 3. The controller 3 detects a state of the ignition switch 8, which is whether the ignition switch is ON or OFF.

In the seat occupancy determination apparatus 10 according to this disclosure, the adult possibility determination portion 34*b* is a processing portion for restraining a process of determining whether the vehicle seat 1 is occupied by an adult or by the child safety seat 5 from being processed in a case where the vehicle seat 1 is definitely occupied by the child safety seat 5 strapped into the vehicle seat 1. The adult possibility determination portion 34*b* obtains the front-rear load sum value (fLF+fLR) at a first time point D1 or earlier relative to the first time point D1 and compares the front-rear load sum value (fLF+fLR) with the adult determination threshold value Q. The first time point D1 is defined by going back in time by a first predetermined length of time T1 relative to the time point of engagement L, which is the point in time where the tongue plate 63 engages with the buckle 64 detected in the seat belt engagement time determination portion 34*a*. Hereinafter, the front-rear load sum value (fLF+fLR) at a point in time at the first time point D1 or earlier relative to the first time point D1 will be referred to as a front-rear load sum base value (fLF+fLR)B in order to clearly differentiate from other front-rear load sum values (fLF+fLR) to be described. In a state where the front-rear load sum base value (fLF+fLR)B is equal to or more than the adult determination threshold value Q, the vehicle seat 1 is determined as either occupied by an adult seating on the vehicle seat 1 or a person in a process of attaching the child safety seat 5 into the vehicle seat 1. In a state where the front-rear load sum base value (fLF+fLR)B is less than the adult determination threshold value Q, the vehicle seat 1 is determined as occupied by the child safety seat 5 strapped into the vehicle seat 1. The front-rear load sum base value (fLF+fLR)B may be compared with the adult determination threshold value Q either immediately after a calculation in the front-rear load sum computing portion 35 as in the seat occupancy determination apparatus 10 according to the embodiment, or after a calculated value is stored in the memory portion 33. After the adult possibility determination portion 34*b* determines that the vehicle seat 1 is possibly occupied by an adult seating on the vehicle seat 1, the child safety seat determination portion 34*c* determines whether the vehicle seat 1 is occupied by an adult seating on the vehicle seat 1 or the child safety seat 5 is strapped into the vehicle seat 1.

The child safety seat determination portion 34*c* is described next. In order to describe the child safety seat determination portion 34*c*, a difference between a load applied on the frontward load sensor LF, which serves as the first load detection sensor, and the rearward load sensor LR, which serves as the second load detection sensor, in a state where the vehicle seat 1 is occupied by an adult seating on the vehicle seat 1 and a state where the vehicle seat 1 is occupied by the child safety seat 5 strapped into the vehicle seat 1 is described.

Figure 4A:
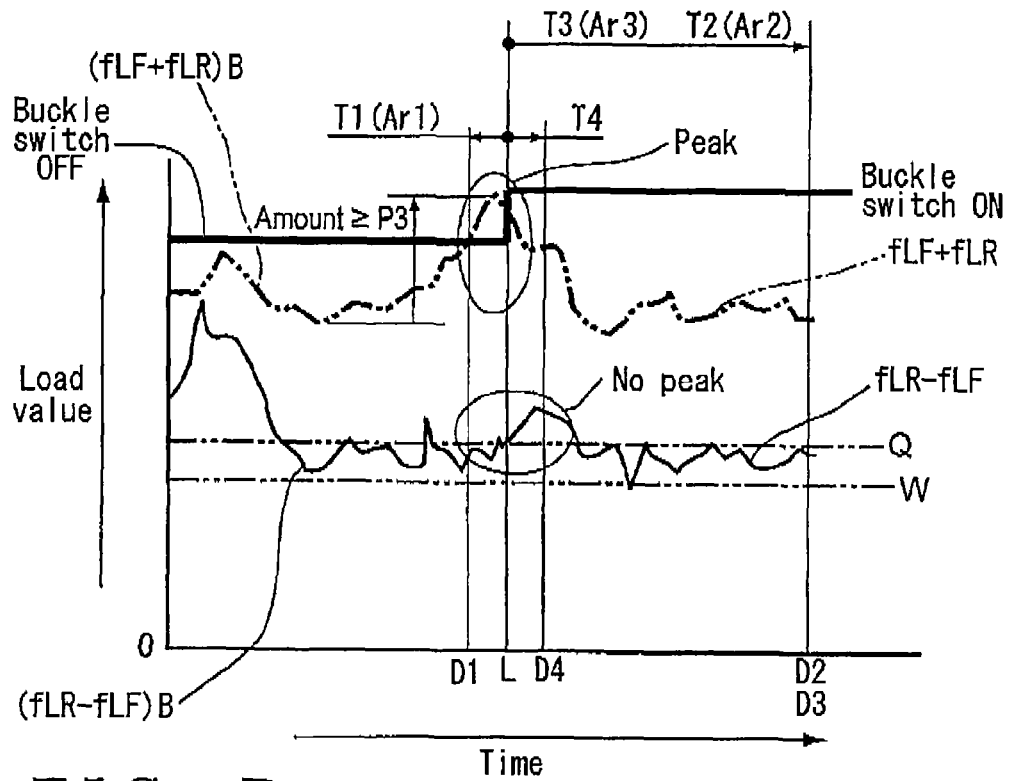
FIG. 4A is a graph showing an example of a load fluctuation behavior in a case where an adult is occupying the vehicle seat.

First, a case where the vehicle seat 1 is occupied by an adult seating on the vehicle seat 1 is described. In the seat occupancy determination apparatus 10 according to this disclosure, the frontward load sensor LF, which serves as the first load detection sensor, and the rearward load sensor LR, which serves as the second load detection sensor, are arranged with a distance between each other in the frontward and rearward direction of the vehicle seat 1 beneath an end portion of the vehicle seat 1 in the same direction as where the buckle 64 is arranged, as FIG. 1 illustrates. In a state where the frontward load sensor LF and the rearward load sensor LR are accordingly arranged and the adult who occupies the vehicle seat 1 attempts to fasten the seat belt device 6 by shifting a center of weight in the direction of the buckle 64 to insert the tongue plate 63 into the buckle 64 to engage the tongue plate 63 with the buckle 64, each of the frontward load sensor LF and the rearward load sensor LR receives substantially equal amount of load, the frontward load sensor LF and the rearward load sensor LR, which are arranged at the frontward and rearward positions of the vehicle seat 1 at the end portion of the vehicle seat 1 in the same direction as where the buckle 64 is arranged. Accordingly, the front-rear load difference values (fLR−fLF) are substantially unchanged within a time range around the time point of engagement L, which is the point in time where the tongue plate 63 engages with the buckle 64. In comparison, the front-rear load sum values (fLF+fLR) increase by an amount as much as a load due to the adult who occupies the vehicle seat 1 shifting the center of weight, which results in generating a state having a peak within the time range around the time point of engagement L. Experiments indicate that the peak of the front-rear load sum values (fLF+fLR) is generated in most cases at a point in time slightly earlier relative to the time point of engagement L, which is the point in time where the tongue plate 63 engages with the buckle 64 similarly to FIG. 4A illustrates.

Figure 4B:
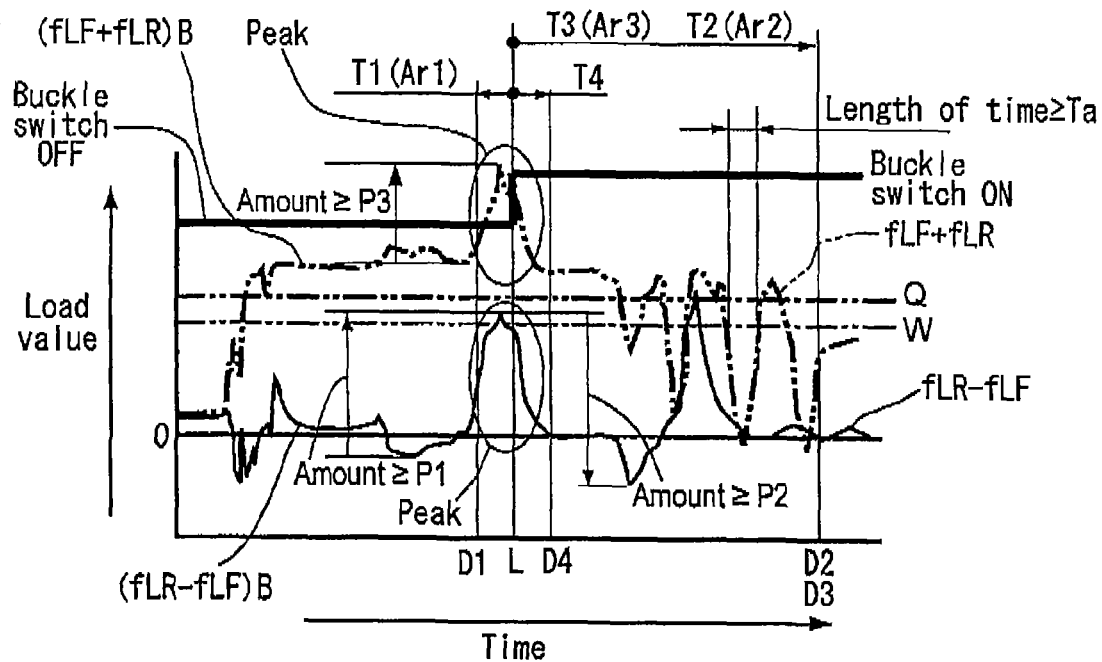
FIG. 4B is a graph showing an example of a load fluctuation behavior in a case where a child safety seat is strapped into the vehicle seat.

By contrast, in a case where the child safety seat 5 is strapped into the vehicle seat 1, in many cases, an adult pushes the body against the child safety seat 5 in the downward direction while shifting the center of weight in the direction of the buckle 64 in order to engage the tongue plate 63 with the buckle 64. Accordingly, the rearward load sensor LR, which is arranged at a position beneath the buckle 64, receives a large amount of load. At this time a frontward portion of the vehicle seat 1 is lifted in the upward direction of the vehicle seat 1 with a pivoting point at a position in a periphery of the rearward load sensor LR. Accordingly, the frontward load sensor LF, which is arranged beneath a frontward portion of the vehicle seat 1, receives a negative value load that makes the frontward load value fLF slightly smaller. As a result, the front-rear load difference value (fLR−fLF) becomes large and accordingly, as FIG. 4B illustrates, the front-rear load difference value (fLR−fLF) increases by an amount more than a first predetermined amount P1 relative to the front-rear load difference value (fLR−fLF) at the first time point D1 or earlier relative to the first time point D1. At the same time, the front-rear load sum value (fLF+fLR) increases as a result of an increasing amount of the rearward load value fLR, which serves as the second load value, being larger than a decreasing amount of the frontward load value fLF, which serves as the first load value. The experiments indicate that the peak caused by an increase of the front-rear load difference value (fLR−fLF) and the peak caused by an increase of the front-rear load sum value (fLF+fLR) are generated in most cases at a point in time slightly earlier relative to the time point of engagement L where the tongue plate 63 engages with the buckle 64 similarly to FIG. 4B illustrates.

Accordingly, the child safety seat determination portion 34c confirms whether or not a first predetermined amount increase condition of the seat occupancy determination apparatus 10 according to this disclosure satisfies. The first predetermined amount increase condition is a condition where the front-rear load difference value (fLR−fLF) stored in the memory portion 33, the front-rear load difference value (fLR−fLF) at the time point of engagement L or within a time range between the time point of engagement L and the first time point D1, which is the point in time defined by going back in time by the first predetermined length of time T1 from the time point of engagement L, increases by an amount equal to or more than the first predetermined amount P1 relative to the front-rear load difference value (fLR−fLF) at the first time point D1 or earlier relative to the first time point D1, which is the point in time defined by going back in time by the first predetermined length of time T1 from the time point of engagement L. Note that the time range between the time point of engagement L and the first time point D1 including the time point of engagement L is hereinafter referred to as a first predetermined time range Ar1. Also note that the front-rear load difference value (fLR−fLF) at the first time point D1 or earlier relative to the first time point D1 is hereinafter referred to as the front-rear load difference base value (fLR−fLF)B in order to clearly differentiate from other front-rear load difference values (fLR−fLF) to be described.

In addition, the child safety seat determination portion 34c confirms whether or not a second predetermined amount decrease condition of the seat occupancy determination apparatus 10 according to this disclosure satisfies. The second predetermined amount decrease condition is a condition where the front-rear load difference value (fLR−fLF) that satisfies the first predetermined amount increase condition decreases by an amount equal to or more than a predetermined amount P2 relative to the front-rear load difference value (fLR−fLF) at the time point of engagement L or within a time range between the time point of engagement L and the second time point D2, which is the point in time elapsed by a second predetermined length of time T2 relative to the time point of engagement L. Note that the time range between the time point of engagement L and the second time point D2 including the time point of engagement L is hereinafter referred to as a second predetermined time range Ar2. The first predetermined length of time T1 that defines the first predetermined time range Ar1, the second predetermined length of time T2 that defines the second predetermined time range Ar2, the first predetermined amount P1 and the second predetermined amount P2 are appropriately selected in advance from experiments. As a restriction, the first predetermined time T1 is shorter than the length of time the memory portion 33 may store data so that the memory portion 33 may store appropriate amount of data. Accordingly, the child safety seat determination portion 34c obtains appropriate amount of front-rear load difference values (fLR−fLF) within the first predetermined time range Ar1, which is stored in the memory portion 33, to provide appropriate results.

Furthermore, the child safety seat determination portion 34c uses front-rear load sum values (fLF+fLR) to confirm that the vehicle seat 1 is occupied by the child safety seat 5 strapped into the vehicle seat 1. The child safety seat determination portion 34c confirms that a third predetermined amount increase condition satisfies. The third predetermined amount increase condition is a condition where the front-rear load sum value (fLF+fLR) stored in the memory portion 33 increases by an amount more than a third predetermined amount P3 at the time point of engagement L or within the time range between the time point of engagement L and a point in time defined by going back in time by the first predetermined length of time T1, which is the first predetermined time range Ar1, relative to the front-rear load sum base value (fLF+fLR)B. As mentioned earlier, the experiments indicate that in most cases in an attempt to attach the child safety seat 5 to the vehicle seat 1, the peak of the front-rear load sum values (fLF+fLR) is generated at a point in time slightly earlier relative to the time point of engagement L.

Following the confirmation that the third predetermined amount increase condition has satisfied, the child safety seat determination portion 34c confirms that a decreasing condition to less than child safety seat determination threshold value of the seat occupancy determination apparatus 10 according to this disclosure satisfies. The decreasing condition to less than child safety seat determination threshold value is a condition where the front-rear load sum values (fLF+fLR) continue to fall below the child safety seat determination threshold value W for a length of time equal to or longer than a predetermined length of time Ta within a time range between the time point of engagement L and a point in time where a third predetermined length of time T3 has elapsed, the time range including the time point of engagement L. Note that the time range between the time point of engagement L and a point in time where a third predetermined length of time T3 has elapsed, which includes the time point of engagement L, is hereinafter referred to as the third predetermined time range Ar3. In other words, from the behavior of the front-rear load sum values (fLF+fLR) described herewith, the child safety seat determination portion 34c confirms that a person attaching the child safety seat 5 has completed a series of actions for attaching the child safety seat 5 and has left the child safety seat 5. In a state where each of the first predetermined amount increase condition, the second predetermined amount increase condition, the third predetermined amount increase condition, and the decreasing condition to less than child safety seat determination threshold value has satisfied, similarly to FIG. 4B illustrates, the child safety seat determination portion 34c determines that the vehicle seat 1 is occupied by the child safety seat 5 strapped into the vehicle seat 1. Accordingly, the child safety seat determination portion 34c accurately determines that the vehicle seat 1 is occupied by the child safety seat 5 strapped into the vehicle seat 1.

Values for the third predetermined amount P3, the third predetermined length of time T3, and the predetermined length of time Ta are appropriately selected from evaluations or other reasoning in advance. In the seat occupancy determination apparatus 10 according to the embodiment, a third time point D3, which is a point in time where the third predetermined length of time T3 has elapsed relative to the time point of engagement L, and the second time point D2 used in the child safety seat determination portion 34c are arranged to have an equal value. Furthermore, the third predetermined length of time T3 and the second predetermined length of time T2 are arranged to have an equal value. Nevertheless, the arrangements are not limited to such and different values may be appropriately selected based on results of experiments or other reasoning. Furthermore, the child safety seat determination threshold value W is a value that derives from an actual weight of the child safety seat 5 and may be set to have a value equaling the aforementioned adult determination threshold value Q.

In the seat occupancy determination apparatus 10 according to the embodiment, the child safety seat determination portion 34c uses the front-rear load difference values (fLR−fLF) to confirm whether or not the front-rear load difference values (fLR−fLF) satisfy the first predetermined amount increase condition and the second predetermined amount decrease condition. Upon the confirmation of satisfaction of each condition, the child safety seat determination portion 34c uses the front-rear load sum values (fLF+fLR) to confirm whether or not the front-rear load sum values (fLF+fLR) satisfy the third predetermined amount increase condition and the decreasing condition to less than child safety seat determination threshold value so that an accuracy of determined results may be increased. Nevertheless, the arrangement for the determinations is not limited to such and determinations using the front-rear load sum values (fLF+fLR), which refers to processes of determination to confirm whether the third predetermined amount increase condition and the decreasing condition to less than child safety seat determination threshold value satisfy or not, may be omitted. A determination that the vehicle seat 1 is occupied by the child safety seat 5 strapped into the vehicle seat 1 may be reasonably determined solely from using the front-rear load difference values (fLR−fLF).

Figure 6:
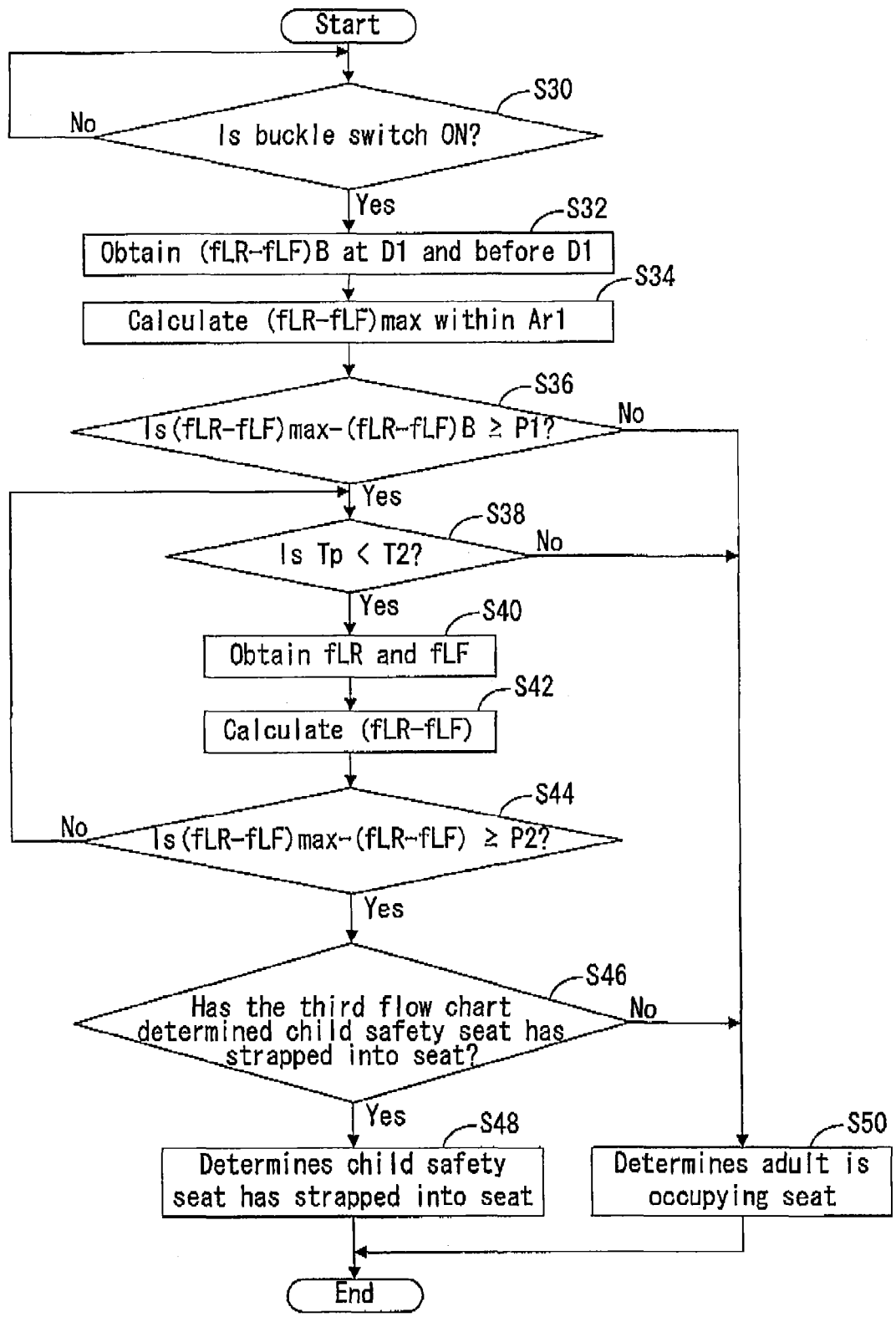
FIG. 6 is a second flow chart describing a process of determining whether an adult is seated on the vehicle seat or a child safety seat is strapped into the seat.
Figure 7:
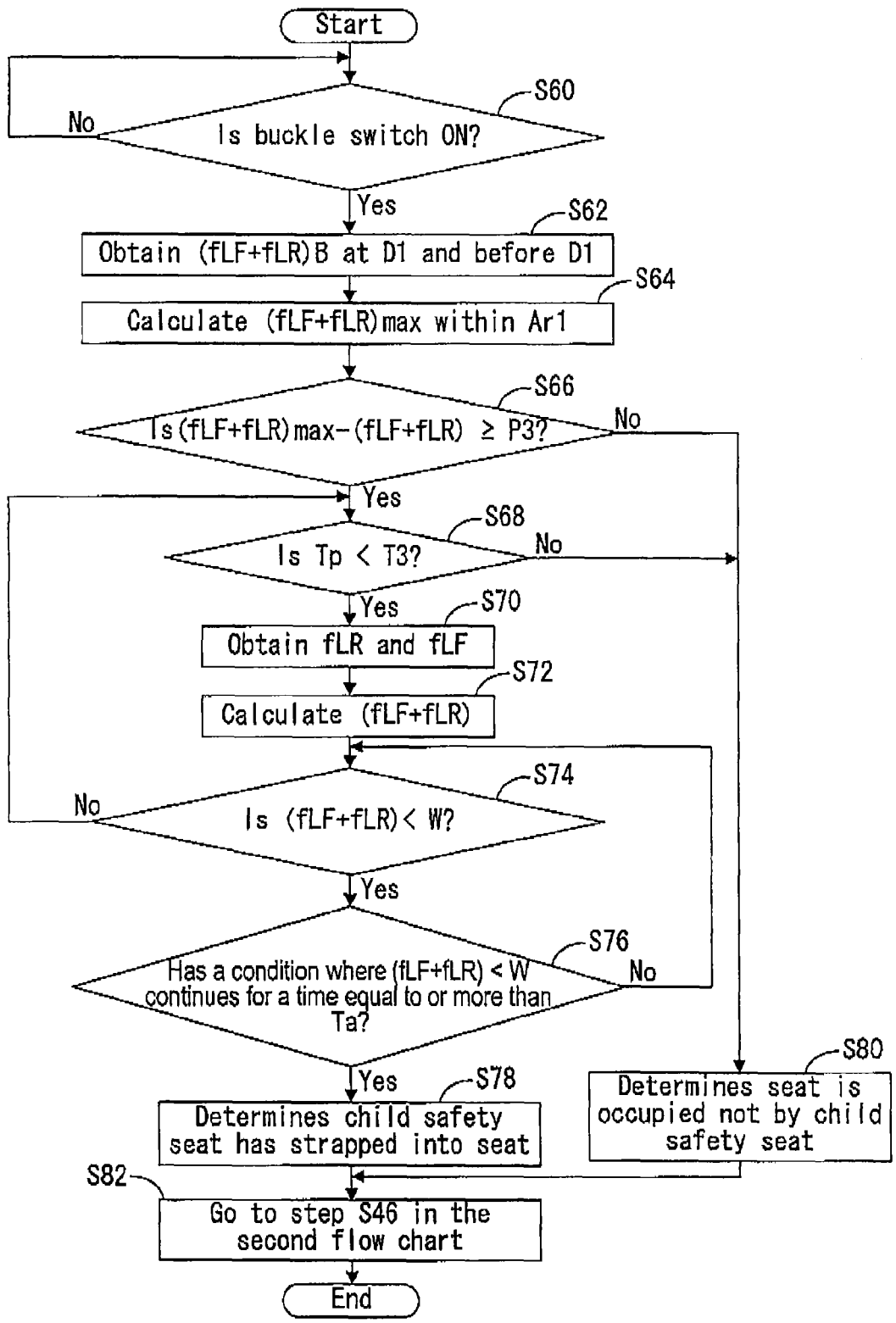
FIG. 7 is a third flow chart describing a process of determining whether the adult is seated on the vehicle seat or a child safety seat is strapped into the seat.

How the seat occupancy determination apparatus 10 according to the embodiment operates is described next referring to a first flow chart shown in FIG. 5, a second flow chart shown in FIG. 6, and a third flow chart shown in FIG. 7. The first flow chart is a subroutine, which is a program to calculate the front-rear load sum values (fLF+fLR) and the front-rear load difference values (fLR−fLF) by obtaining the rearward load values fLR, which serve as the second load values, and the frontward load values fLF, which serve as the first load values, mainly before a seat belt attachment, which is at a time earlier relative to the time point of engagement L. Note that the seat occupancy determination apparatus 10 may obtain the rearward load values fLR, which serve as the second load values, and the frontward load values fLF, which serve as the first load values, even in a state where the ignition of the vehicle is not ON. The second flow chart is a program to determine whether the vehicle seat 1 is occupied by the child safety seat 5 strapped into the seat or by an adult seating on the vehicle seat 1 by integrating a result of determination process that bases on the front-rear load difference values (fLR−fLF) and a result of determination process through the third flow chart that bases on the front-rear load sum values (fLF+fLR). The third flow chart is a subroutine, which is a program to provide the result of determination process that bases on the front-rear load sum values (fLF+fLR) to the second flow chart. Note that the first flow chart, the second flow chart, and the third flow chart are parallelly-processed.

First, the first flow chart shown in FIG. 5 is described. As the first flow chart in FIG. 5 shows, a step S10 is at a time at the time point of engagement L or before the time point of engagement L where the buckle switch 65 turns to ON. At the step S10, the frontward load values fLF, which serves as the first load values, and the rearward load values fLR, which serves as the second load values, are obtained with a predetermined interval between each value, for example, every 100 millisecond. Each of the frontward load values fLF and each of the rearward load values fLR obtained is paired with information of detected time. The time is detected by a timer built-in to a control device.

At a step S12, which is processed in the front-rear load sum computing portion 35, the front-rear load sum base values (fLF+fLR)B are calculated and calculated results are sent to the memory portion 33. At a step S14, which is processed in the front-rear load difference computing portion 36, the front-rear load difference base values (fLR−fLF)B are calculated and calculated results are sent to the memory portion 33. At this point, the seat belt device 6 is not fastened and the time point of engagement L is not defined yet and whether the obtained data is obtained at the first time point D1 or earlier relative to the first time point D1 or not is unknown. The data obtained at the first time point D1, the data obtained earlier relative to the first time point D1 and the data obtained between the time point of engagement L and the first time point D1 are distinguished at a time where the time point of engagement L is defined later. Accordingly, each of the front-rear load sum base values (fLF+fLR)B and each of the front-rear load difference base values (fLR−fLF) B, each of which is obtained as a result of calculation and stored in the memory portion 33, is paired with information of time, which is the time where each of the frontward load values fLF and each of the rearward load values fLR is obtained.

At a step S16, which is processed in the seat belt engagement time determination portion 34a, whether the tongue plate 63 is engaged with the buckle 64 and the buckle switch 65 is turned ON or not is confirmed. In a state where the buckle switch 65 is confirmed as turned ON, the program proceeds to a step S18. In a state where the buckle switch 65 remains in the OFF state, the program proceeds to the step S10 and repeats the aforementioned processes starting from the step S10. At the step S18, which is processed in the seat belt engagement time determination portion 34a, information of time Ton that corresponds to the time point of engagement L, which is the point in time where the buckle switch turns to ON by the tongue plate 63 engaging with the buckle 64, is stored in the memory portion 33.

At a step S20, which is processed in the adult possibility determination portion 34b, whether or not the front-rear load sum base value (fLF+fLR)B, which is stored in the memory portion 33 paired with the information of time, is equal to or more than the adult determination threshold value Q is determined. The front-rear load sum base values (fLF+fLR)B to consider in determination process is the front-rear load sum base value (fLF+fLR)B at the first time point D1 and the front-rear load sum base values (fLF+fLR)B earlier relative to the first time point D1, where the first time point D1 is the point in time defined by going back in time by the first predetermined length of time T1 relative to the time Ton, which corresponds to the time point of engagement L. An appropriately selected amount of data of the front-rear load sum base values (fLF+fLR)B to compare with the adult determination threshold value Q may be obtained for an adult determination by selecting a time range defined by going back in time by a selected length of time relative to the first time point D1. The data of the front-rear load sum base value (fLF+fLR)B to compare with the adult determination threshold value Q may be an average value calculated from the selected amount of data within a selected time range or a value selected at a certain time point within the selected time range. The front-rear load sum base value (fLF+fLR)B may be a minimum value or a maximum value within the selected time range. In a state where the front-rear load sum base value (fLF+fLR)B is equal to or more than the adult determination threshold value Q, which leads to a determination that the vehicle seat 1 is possibly occupied by an adult seating on the vehicle seat 1, the program proceeds to a step S22. In a state where the front-rear load sum base value (fLF+fLR)B is less than the adult determination threshold value Q, which leads to a determination that the vehicle seat 1 is either definitely occupied by the child safety seat 5 strapped into the vehicle seat 1 or occupied by no occupant, the program ends.

At the step S22, the front-rear load sum values (fLF+fLR) within the first predetermined time range Ar1 are obtained from the front-rear load sum values (fLF+fLR) stored in the memory portion 33. At a step S24, the front-rear load difference values (fLR−fLF) within the first predetermined time range Ar1 are obtained from the front-rear load difference values (fLR−fLF) stored the memory portion 33. The first predetermined time range Ar1 is the time range between the time Ton corresponding to the time point of engagement L and the first time point D1, the time range including the time point of engagement L. The front-rear load sum values (fLF+fLR) within the first predetermined time range Ar1 and the front-rear load difference values (fLR−fLF) within the first predetermined time range Ar1 are stored in the memory portion 33 as the data within the first predetermined time range Ar1 at each step, and then the program ends.

Next, how the second flow chart operates is described. In the second flow chart, a step S30, which is processed in the seat belt engagement time determination portion 34a, repeats itself until the buckle switch 65 turns to ON. In a state where the buckle switch 65 is turned to ON, the program proceeds to a step S32 to initiate a control process.

At the step S32, which is processed in the child safety seat determination portion 34c, the front-rear load difference base values (fLR−fLF)B, which are calculated at the step S14 in the first flow chart and stored in the memory portion 33, are obtained from the memory portion 33. The front-rear load difference base value (fLR−fLF)B is the front-rear load difference value (fLR−fLF) at the first time point D1 or earlier relative to the first time point D1. The front-rear load difference base value (fLR−fLF)B may be an average value within a selected time range or a value selected at a certain time point within the selected time range. The front-rear load difference base value (fLR−fLF)B may be a minimum value or a maximum value within the selected time range.

At the step S34, which is processed in the child safety seat determination portion 34c, each one of the front-rear load difference values (fLR−fLF) within the first predetermined time range Ar1, which is obtained at the step S24 in the first flow chart and stored in the memory portion 33, is obtained from the memory portion 33 to calculate a maximum front-rear load difference value (fLR−fLF)max within the front-rear load difference values (fLR−fLF) within the first predetermined time range Ar1.

At a step S36, which is processed in the child safety seat determination portion 34c, a value subtracting the front-rear load difference base value (fLR−fLF)B from the maximum front-rear load difference value (fLR−fLF)max, which is a difference indicating an amount of the front-rear load difference value (fLR−fLF) increased within the first predetermined time range Ar1 from the front-rear load difference base value (fLR−fLF)B, is calculated to determine whether or not the front-rear load difference value (fLR−fLF) increases by an amount equal to or more than the first predetermined amount P1. In other words, at the step S36, whether the first predetermined amount increase condition satisfies or not is determined. In a state where the amount of increase is equal to or more than the first predetermined amount P1, the program proceeds to a step S38. In a state where the amount of increase is less than the first predetermined amount P1, the program proceeds to a step S50, which is where the vehicle seat 1 is determined as occupied by an adult seating on the vehicle seat 1, and then the program ends.

At the step S38, which is processed in the child safety seat determination portion 34c, whether or not an elapsed time Tp relative to the time point of engagement L is equal to or more than the second predetermined length of time T2 is confirmed. The elapsed time Tp is measured by the timer built-in to the control device. In a state where the elapsed time Tp relative to the time point of engagement L is less than the second predetermined length of time T2, the front-rear load difference value (fLR−fLF) is determined as within a range of determination period so that the program proceeds to a step S40. In a state where the elapsed time Tp relative to the time point of engagement L is equal to or more than the second predetermined length of time T2, the front-rear load difference value (fLR−fLF) is determined as out of the range of determination period so that the program proceeds to the step S50, which is where the vehicle seat 1 is determined as occupied by an adult seating on the vehicle seat 1, and then the program ends.

At the step S40, the program of the second flow chart obtains the frontward load value fLF, which serves as the first load value, detected by the frontward load sensor LF, which serves as the first load detection sensor, and the rearward load value fLR, which serves as the second load value, detected by the rearward load sensor LR, which serves as the second load detection sensor. At a step S42, which is processed in the front-rear load difference computing portion 36, the front-rear load difference value (fLR−fLF) is calculated and a calculated result is sent to the memory portion 33.

At a step S44, which is processed in the child safety seat determination portion 34c, the front-rear load difference value (fLR−fLF) calculated in the step S42 is subtracted from the maximum front-rear load difference value (fLR−fLF)max calculated in the step S34 to confirm whether or not the value after the subtraction is equal to or more than the second predetermined amount P2. In other words, at the step S44, whether the second predetermined amount decrease condition satisfies or not is confirmed. A state where the value after the subtraction is equal to or more than the second predetermined amount P2 indicates that the person attaching the child safety seat 5 has completed the procedures relating to attaching the child safety seat 5 and has left the child safety seat 5 so that the program proceeds to a step S46. In a state where the value after the subtraction is less than the second predetermined amount P2, the program returns to the step S38 and repeats the process from the step S38 until the calculated result of subtracting the front-rear load difference value (fLR−fLF) from the maximum front-rear load difference value (fLR−fLF) max becomes equal to or more than the predetermined amount P2 or until the elapsed time Tp becomes equal to or more than the second predetermined length of time T2 at the step S38.

At the step S46, a result of determination in the third flow chart, which will be described in detail later, is confirmed. In a state where the result of determination obtained from the third flow chart is a determination that the vehicle seat 1 is occupied by the child safety seat 5 strapped into the vehicle seat 1, the program proceeds to a step S48, which is processed in the child safety seat determination portion 34c, and determines that the vehicle seat 1 is occupied by the child safety seat 5 strapped into the vehicle seat 1. In a state where the result of determination from the third flow chart is a determination that the vehicle seat 1 is not occupied by the child safety seat 5 strapped into the vehicle seat 1, the program proceeds to a step S50, which is processed in the child safety seat determination portion 34c, where the vehicle seat 1 is determined as occupied by an adult seating on the vehicle seat 1, and then the program ends.

Next, how the third flow chart operates is described. The third flow chart mainly operates based on the front-rear load sum values (fLF+fLR) to determine what occupies the vehicle seat 1. In the third flow chart, a step S60, which is processed in the seat belt engagement time determination portion 34a, repeats itself until the buckle switch 65 turns to ON, similarly to the second flow chart. In a state where the buckle switch 65 is turned to ON, the program proceeds to a step S62 to initiate a control process. Accordingly, the time point of engagement L, which is the point in time where the tongue plate 63 engages with the buckle 64, is simultaneously recognized in the first flow chart, the second flow chart, and the third flow chart.

At the step S62, which is processed in the child safety seat determination portion 34c, the front-rear load sum base value (fLF+fLR)B, which is calculated at the step S12 in the first flow chart and stored in the memory portion 33, is obtained from the memory portion 33. The front-rear load sum base value (fLF+fLR)B is the front-rear load sum value (fLF+fLR) at the first time point D1 or earlier relative to the first time point D1. The front-rear load sum base value (fLF+fLR)B may be an average value within a selected time range or a value selected at a certain time point within the selected time range. The front-rear load sum base value (fLF+fLR)B may be a minimum value or a maximum value within the selected time range.

At a step S64, which is processed in the child safety seat determination portion 34c, each one of the front-rear load sum values (fLF+fLR) within the first predetermined time range Ar1, which is obtained at the step S22 in the first flow chart and stored in the memory portion 33, is obtained from the memory portion 33 to calculate a maximum front-rear load sum value (fLF+fLR)max within the front-rear load sum values (fLF+fLR) within the first predetermined time range Ar1.

At the step S66, which is processed in the child safety seat determination portion 34c, a value subtracting the front-rear load sum base value (fLF+fLR)B from the maximum front-rear load sum value (fLF+fLR)max, which is a difference indicating an amount of the front-rear load sum value (fLF+fLR) increased within the first predetermined time range Ar1 from the front-rear load sum base value (fLF+fLR)B, is calculated to determine whether or not the front-rear load sum value (fLF+fLR) increases by an amount equal to or more than the third predetermined amount P3. In other words, at the step S66, whether the third predetermined amount increase condition satisfies or not is determined. As described earlier, the step S66 is to confirm whether or not the peak as a result of an amount of increase that equals to or more than the third predetermined amount P3 is generated, the peak that is generated in a case where the vehicle seat 1 is occupied by the child safety seat 5 strapped into the vehicle seat 1. In a state where the amount of increase is equal to or more than the third predetermined amount P3, the program proceeds to a step S68. In a state where the amount of increase is less than the third predetermined amount P3, the program proceeds to a step S80 where the vehicle seat 1 is determined as occupied not by the child safety seat 5 strapped into the vehicle seat 1. The program then proceeds to a step S82 and proceeds to the step S46 in the second flow chart.

At the step S68, which is processed in the child safety seat determination portion 34c, whether or not an elapsed time Tp relative to the time point of engagement L, which is the point in time where the tongue plate 63 engages with the buckle 64, is less than the third predetermined length of time T3 is confirmed. In a state where the elapsed time Tp relative to the time point of engagement L is less than the third predetermined length of time T3, the front-rear load sum value (fLF+fLR) is determined as within a range of determination period so that the program proceeds to a step S70. In a state where the elapsed time Tp relative to the time point of engagement L is equal to or more than the third predetermined length of time T3, the front-rear load sum value (fLF+fLR) is determined as out of the range of determination period so that the program proceeds to the step S80 where the vehicle seat 1 is determined as occupied not by the child safety seat 5 strapped into the vehicle seat 1. The program then proceeds to the step S82 and proceeds to the step S46 in the second flow chart.

At the step S70, which is processed in the child safety seat determination portion 34c, the program of the third flow chart obtains the frontward load value fLF, which serves as the first load value and the rearward load value fLR, which serves as the second load value. At a step S72, which is processed in the front-rear load sum computing portion 35, the front-rear load sum value (fLF+fLR) is calculated and a calculated result is sent to the memory portion 33.

At a step S74, which is processed in the child safety seat determination portion 34c, whether or not the front-rear load sum value (fLF+fLR) calculated in the step S72 is less than the child safety seat determination threshold value W, which derives from the actual weight of the child safety seat 5, is confirmed to confirm that the decreasing condition to less than child safety seat determination threshold value satisfies. In a state where the front-rear load sum value (fLF+fLR) is less than the child safety seat determination threshold value W, the program proceeds to a step S76. In a state where the front-rear load sum value (fLF+fLR) is equal to or more than the child safety seat determination threshold value W, the program returns to the step S68 and repeats the process from the step S68 until the front-rear load sum value (fLF+fLR) becomes less than the child safety seat determination threshold value W at the step S74 or until the elapsed time Tp becomes equal to or more than the third predetermined length of time T3 at the step S68.

At the step S76, which is processed in the child safety seat determination portion 34c, whether the front-rear load sum value (fLF+fLR) confirmed as less than the child safety seat determination threshold value W continues to remain less than the child safety seat determination threshold value W for the predetermined length of time Ta or not is confirmed. In other words, at the step S76, whether the decreasing condition to less than child safety seat determination threshold value satisfies or not is confirmed. The step S76 excludes a possible occasion where the front-rear load sum value (fLF+fLR) temporarily decreases in a state where the occupant seated on the vehicle seat 1 shifting weight on the vehicle seat 1 from being determined as the child safety seat 5 strapped into the vehicle seat 1. Unless the state where the front-rear load sum value (fLF+fLR) is less than the child safety seat determination threshold value W continues for the predetermined length of time Ta, the program returns to the step S74. The step S76 continues to return to the step S74 until the state where the front-rear load sum value (fLF+fLR) remains less than the child safety seat determination threshold value W continues for a length of time that is equal to or more than the predetermined length of time Ta.

In a state where the front-rear load sum value (fLF+fLR) is less than the child safety seat determination threshold value W continues for a length of time that is equal to or more than the predetermined length of time Ta, the program proceeds to a step S78, which is processed in the child safety seat determination portion 34c, where the vehicle seat 1 is determined as occupied by the child safety seat 5 strapped into the vehicle seat 1. The program then proceeds to the step S82, which is processed in the child safety seat determination portion 34c, and then proceeds to the step S46 in the second flow chart. A length of time of the predetermined length of time Ta is measured by the timer built-in to the control device. At the step S46 of the second flow chart whether or not the vehicle seat 1 is occupied by the child safety seat 5 strapped into the vehicle seat 1 is determined through the aforementioned process.

In the seat occupancy determination apparatus 10 according to the embodiment, the first flow chart, the second flow chart, and the third flow chart are parallelly-processed to determine whether or not the vehicle seat 1 is occupied by the child safety seat 5 strapped into the vehicle seat 1. Nevertheless, the third flow chart may be omitted to determine whether or not the vehicle seat 1 is occupied by the child safety seat 5 strapped into the vehicle seat 1. In a state where the third flow chart is omitted, the step S46 in the second flow chart may be omitted. Even without processing the third flow chart, whether or not the vehicle seat 1 is occupied by the child safety seat 5 strapped into the vehicle seat 1 is reasonably determined.

Upon the arrangement described herewith, the child safety seat determination portion 34c of the seat occupancy determination apparatus 10 according to the embodiment confirms that the front-rear load difference value (fLR−fLF) within the first predetermined time range Ar1 satisfies the first predetermined amount increase condition where the front-rear load difference value (fLR−fLF) increases by an amount equal to or more than the first predetermined amount P1 relative to the front-rear load difference value (fLR−fLF) at the first time point D1 or earlier relative to the first time point D1. In addition, the child safety seat determination portion 34c confirms that within the second predetermined time range Ar2, the front-rear load difference value (fLR−fLF) increased by the amount equal to or more than the first predetermined amount P1 satisfies the second predetermined amount decrease condition where the front-rear load difference value (fLR−fLF) decreases by an amount equal to or more than the second predetermined amount P2. Also, the child safety seat determination portion 34c confirms that the front-rear load sum value (fLF+fLR) satisfies the third predetermined amount increase condition where the front-rear load sum value (fLF+fLR) within the first predetermined time range Ar1 increases by an amount equal to or more than the third predetermined amount P3 relative to the front-rear load sum base value (fLF+fLR)B, which is the front-rear load sum value (fLF+fLR) at the first time point D1 or earlier relative to the first time point D1. Furthermore, the child safety seat determination portion 34c confirms that the front-rear load sum value (fLF+fLR) satisfies the decreasing condition to less than child safety seat determination threshold value where the front-rear load sum values (fLF+fLR) within the third predetermined time range Ar3 continue to remain less than the child safety seat determination threshold value W for a length of time equal to or more than the predetermined length of time Ta. In a state where the child safety seat determination portion 34c confirms that the front-rear load difference values (fLR−fLF) satisfy the first predetermined amount increase condition and the second predetermined amount decrease condition and that the front-rear load sum values (fLF+fLR) satisfy the third predetermined amount increase condition and the decreasing condition to less than child safety seat determination threshold value, the child safety seat determination portion 34c determines that the vehicle seat 1 is occupied by the child safety seat 5 strapped into the vehicle seat 1. Accordingly, the seat occupancy determination apparatus 10 using two load detection sensors that accurately determines a seat occupant with reasonable cost may be provided.

The child safety seat determination portion 34c of the seat occupancy determination apparatus 10 according to the embodiment may determine whether or not the vehicle seat 1 is occupied by the child safety seat 5 strapped into the vehicle seat 1 by using the front-rear load difference values (fLR−fLF) alone. Upon the arrangement described herewith, the seat occupancy determination apparatus 10 having a simplified configuration and further reasonable cost may be provided.

In the seat occupancy determination apparatus 10 according to the embodiment, the first predetermined amount increase condition and the third predetermined amount increase condition are determined in the child safety seat determination portion 34c by using information within the first predetermined time range Ar1 alone. Nevertheless, the arrangement is not limited to such and as an example of other embodiments, the first predetermined amount increase condition and the third predetermined amount increase condition may be determined by using information within a time range between the time point of engagement L and a fourth time point D4, which is a point in time elapsed by a fourth predetermined length of time relative to the time point of engagement L, in addition to the information within the first predetermined time range Ar1. Accordingly, the peaks of the front-rear load sum values (fLF+fLR) and the front-rear load sum difference values (fLF+fLR) may be effectively detected even in cases where the peaks are generated or appear after the time point of engagement L so that reliability of the determination by the seat occupancy determination apparatus 10 to determine that the vehicle seat 1 is occupied by the child safety seat 5 strapped into the vehicle seat 1 may be improved.

In the seat occupancy determination apparatus 10 according to the embodiment, a passenger seat that is arranged to the right of the driver seat is provided with the seat occupancy determination apparatus 10. Nevertheless, the arrangement is not limited to such and a passenger seat that is arranged to the left of the driver seat of a vehicle with a steering wheel on the right side may be provided with the seat occupancy determination apparatus 10. Upon the arrangement described herewith, two load sensors, which are the first and the second load sensors, may be arranged in a front-rear positioning at a rightward position of and beneath the vehicle seat. The arrangement described herewith is similarly effective as the seat occupancy determination apparatus 10 according to the embodiment.

According to an aspect of this disclosure, the seat occupancy determination apparatus 10 includes the buckle switch 65 detecting attachment and detachment of the tongue plate 63 and the buckle 64 of the seat belt device 6, the frontward load sensor LF and the rearward load sensor LR arranged spaced-apart from each other in frontward and rearward direction beneath a portion of the vehicle seat 1 in the direction where the buckle 64 is provided, the frontward load sensor LF and the rearward load sensor LR independently detecting a part of a load that is applied on the vehicle seat 1, the front-rear load sum computing portion 35 calculating the front-rear load sum value (fLF+fLR) by adding the frontward load value fLF detected by the frontward load sensor LF and the rearward load value fLR detected by the rearward load sensor LR, the front-rear load difference computing portion 36 calculating the front-rear load difference value (fLR−fLF) by subtracting the frontward load value fLF from the rearward load value fLR, the memory portion 33 storing the calculated front-rear load sum value (fLF+fLR) and the calculated front-rear load difference value (fLR−fLF), the adult possibility determination portion 34b determining the vehicle seat 1 is possibly occupied by an adult seating on the vehicle seat 1 in the case where the front-rear load sum value (fLF+fLR) at the first time point D1 or earlier relative to the first time point D1 is larger than the adult determination threshold value Q where the first time point D1 defines the point in time going back by the first predetermined length of time T1 from the time point of engagement L detected as the point in time where the tongue plate 63 engages with the buckle 64, and the child safety seat determination portion 34c determining the vehicle seat 1 determined as possibly occupied by an adult seating on the vehicle seat 1 in the adult possibility determination portion 34b is occupied by the child safety seat 5 strapped into the vehicle seat 1 in the case where the first predetermined amount increase condition satisfies and the second predetermined amount decrease condition satisfies where the first predetermined amount increase condition is the condition where the front-rear load difference value (fLR−fLF) within the time range between the time point of engagement L and the first time point D1 including the time point of engagement L increases by an amount equals to or more than the first predetermined amount P1 from the front-rear load difference value (fLR−fLF) at the first time point D1 or earlier relative to the first time point D1 and the second predetermined amount decrease condition is the condition where the front-rear load difference value (fLR−fLF) increased by the amount equal to or more than the first predetermined amount P1 decreases by an amount equal to or more than the second predetermined amount P2 within the time range between the time point of engagement L and the second time point D2 including the time point of engagement L where the second time point D2 defines the point in time elapsed by the second predetermined length of time T2 from the time point of engagement L.

The seat occupancy determination apparatus 10 according to this disclosure is provided with two load detection sensors, which are a frontward load sensor LF and a rearward load sensor LR, arranged spaced-apart from each other in frontward and rearward direction beneath an end portion of a vehicle seat 1 in a direction where the buckle 64 is provided. Upon the arrangement described herewith, the front-rear load difference values (fLR−fLF) depict different characteristics between a case where an adult seated on the vehicle seat 1 fastening the seat belt by engaging the tongue plate 63 with the buckle 64 and a case where the seat belt is fastened to strap the child safety seat 5 into the vehicle seat 1. More specifically, a peak having an amount of increase that is equal to or more than the first predetermined amount P1 is generated in the front-rear load difference values (fLR−fLF) in the case where the child safety seat 5 is strapped into the vehicle seat 1 while no peak having a large amount of increase is generated in the case where the vehicle seat 1 is occupied by the adult seating on the vehicle seat 1. The seat occupancy determination apparatus 10 according to this disclosure takes a particular note of the characteristics described herewith to determine whether the vehicle seat 1 is occupied by the adult seated on the vehicle seat 1 or the child safety seat 5 strapped into the vehicle seat 1. More specifically, the seat occupancy determination apparatus 10 according to this disclosure determines that the vehicle seat 1 is occupied by the child safety seat 5 strapped into the vehicle seat 1 in a case where the first predetermined amount increase condition and the second predetermined amount decrease condition are satisfied. The first predetermined amount increase condition is the condition where the front-rear load difference value (fLR−fLF) increases by an amount that is equal to or more than the first predetermined amount P1 within the time range between the time point of engagement L and the first time point D1 including the time point of engagement L relative to the front-rear load difference value fLR−fLF at the first time point D1 or earlier relative to the first time point D1 where the time point of engagement L is the point of time where the tongue plate 63 and the buckle 64 engages. The second predetermined amount decrease condition is the condition where the front-rear load difference value (fLR−fLF) increased by the amount equal to or more than the first predetermined amount P1 decreases by an amount equal to or more than the second predetermined amount P2 within the time range between the time point of engagement L and the second time point D2 including the time point of engagement L where the second time point D2 defines the point in time elapsed by the second predetermined length of time T2 from the time point of engagement L. In other words, the seat occupancy determination apparatus 10 according to this disclosure determines that the vehicle seat 1 is occupied by the child safety seat 5 strapped into the vehicle seat 1 in a case where a peaked state is generated in the front-rear load difference values (fLR−fLF) prior to the point in time where the tongue plate 63 and the buckle 64 engages. Accordingly, the seat occupancy determination apparatus 10 using two load detection sensors that accurately determines seat occupant with reasonable cost is provided.

According to another aspect of this disclosure, the child safety seat determination portion 34c of the seat occupancy determination apparatus 10 determines that the vehicle seat 1 is occupied by the child safety seat 5 strapped into the vehicle seat 1 in a case where the third predetermined amount increase condition satisfies and the decreasing condition to less than child safety seat determination threshold value satisfies, where the third predetermined amount increase condition is the condition where the front-rear load sum value (fLF+fLR) within the time range between the time point of engagement L and the first time point D1 including the time point of engagement L increases by an amount equal to or more than the third predetermined amount P3 from the front-rear load sum value (fLF+fLR) at the first time point D1 or earlier relative to the first time point D1 and the decreasing condition to less than child safety seat determination threshold value is the condition where the front-rear load sum values (fLF+fLR) within the time range between the time point of engagement L and the third time point D3 including the time point of engagement L continue to remain less than the child safety seat determination threshold value W for a length of time equaling or longer than the predetermined length of time Ta where the third time point D3 defines the point in time elapsed by the third predetermined length of time T3 from the time point of engagement L.

The child safety seat determination portion 34c of the seat occupancy determination apparatus 10 according to this disclosure determines whether or not the vehicle seat 1 is occupied by the child safety seat 5 strapped into the vehicle seat 1 by using the front-rear load sum values (fLF+fLR) in addition to the front-rear load difference values (fLR−fLF). The child safety seat determination portion 34c determines that the vehicle seat 1 is occupied by the child safety seat 5 strapped into the vehicle seat 1 in a case where each of the first predetermined amount increase condition, the second predetermined amount decrease condition, the third predetermined condition, and the decreasing condition to less than child safety seat determination threshold value is satisfied. The third predetermined amount increase condition is the condition where the front-rear load sum value (fLF+fLR) within the time range between the time point of engagement L and the first time point D1 including the time point of engagement L increases by an amount equals to the third predetermined amount P3 or more from the front-rear load sum value (fLF+fLR) at the first time point D1 or earlier relative to the first time point D1 and the decreasing condition to less than child safety seat determination threshold value is the condition where the front-rear load sum values (fLF+fLR) within the time range between the time point of engagement L and the third time point D3 including the time point of engagement L continue to remain less than the child safety seat determination threshold value W for a length of time that equals to or longer than the predetermined length of time Ta where the third time point D3 defines the point in time elapsed by the third predetermined length of time T3 from the time point of engagement L. The child safety seat determination threshold value W derives from an actual weight of the child safety seat 5. Accordingly, the seat occupancy determination apparatus 10 determines a seat occupant with improved accuracy.

According to further aspect of this disclosure, a determination period to determine the first predetermined amount increase condition of the seat occupancy determination apparatus 10 extends to the fourth time point D4 defining the point in time elapsed by the fourth predetermined length of time T4 from the time point of engagement L.

By extending the determination period to determine the first predetermined amount increase condition of the seat occupancy determination apparatus 10 according to this disclosure to the fourth time point D4 defining the point in time elapsed by the fourth predetermined length of time T4 from the time point of engagement L, the peak of the front-rear load difference values (fLR−fLF) is effectively detected even in a case where the peak is generated after the time point of engagement L so that reliability of the determination by the seat occupancy determination apparatus 10 to determine that the vehicle seat 1 is occupied by the child safety seat 5 strapped into the vehicle seat 1 may be improved.

According to another aspect of this disclosure a determination period to determine the third predetermined amount increase condition of the seat occupancy determination apparatus 10 extends to the fourth time point D4 defining the point in time elapsed by the fourth predetermined length of time T4 from the time point of engagement L.

By extending the determination period to determine the third predetermined amount increase condition of the seat occupancy determination apparatus 10 according to this disclosure to the fourth time point D4 defining the point in time elapsed by the fourth predetermined length of time T4 from the time point of engagement L, the peak of the front-rear load sum values (fLF+fLR) is effectively detected even in a case where the peak is generated after the time point of engagement L so that reliability of the determination by the seat occupancy determination apparatus 10 to determine that the vehicle seat 1 is occupied by the child safety seat 5 strapped into the vehicle seat 1 may be improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat occupancy determination apparatus, comprising:
a seat belt attachment detection device configured to detect attachment and detachment of a tongue plate and a buckle of a seat belt device;
a first load detection sensor and a second load detection sensor arranged spaced-apart from each other in frontward and rearward direction beneath a portion of a vehicle seat in a direction where the buckle is provided, the first load detection sensor and the second load detection sensor configured to independently detect a part of a load that is applied on the vehicle seat; and
a controller configured to:
calculate a front-rear load sum value by adding a first load value detected by the first load detection sensor and a second load value detected by the second load detection sensor;
calculate a front-rear load difference value by subtracting the first load value from the second load value;
store the calculated front-rear load sum value and the calculated front-rear load difference value;
determine that the vehicle seat is possibly occupied by an adult in a case where the front-rear load sum value at a first time point or a time earlier to the first time point is larger than an adult determination threshold value, where the first time point defines a point in time going back by a first predetermined length of time from a time point of engagement detected as a point in time where the tongue plate attaches with the buckle and the time earlier to the first time point is a time within a period defined by (1) a time corresponding to an oldest stored calculated front-rear load sum value and calculated front-rear load difference value and (2) the first time point; and
determine that a child safety seat is strapped into the vehicle seat by the seat belt device in a case where a first predetermined condition and a second predetermined condition are satisfied after it is determined that the vehicle seat is possibly occupied by the adult, wherein
the first predetermined condition is satisfied in a case where the front-rear load difference value, within a time range between the time point of engagement and the first time point including the time point of engagement, increases by an amount equal to or more than a first predetermined amount from the front-rear load difference value at the first time point or the time earlier to the first time point, and the second predetermined condition is satisfied in a case where the front-rear load difference value, increased by the amount equal to or more than the first predetermined amount, decreases by an amount equal to or more than a second predetermined amount within a time range between the time point of engagement and a second time point that defines a point in time elapsed by a second predetermined length of time from the time point of engagement.

2. The seat occupancy determination apparatus according to claim 1, wherein
the controller is further configured to determine that the child safety seat is strapped into the vehicle seat in a case where a third predetermined condition and a fourth predetermined condition are satisfied, wherein
the third predetermined condition is satisfied in a case where the front-rear load sum value, within a time range between the time point of engagement and the first time point including the time point of engagement, increases by an amount equal to or more than a third predetermined amount from the front-rear load sum value at the first time point or the time earlier to the first time point, and
the fourth predetermined condition is satisfied in a case where the front-rear load sum values, within a time range between the time point of engagement and a third time point including the time point of engagement, continue to remain less than a child safety seat determination threshold value for a length of time equal to or longer than a predetermined length of time, where the third time point defines a point in time elapsed by a third predetermined length of time from the time point of engagement.

3. The seat occupancy determination apparatus according to claim 2, wherein a determination period to determine if the third predetermined condition is satisfied extends to a fourth time point defining a point in time elapsed by a fourth predetermined length of time from the time point of engagement.

4. The seat occupancy determination apparatus according to claim 1, wherein a determination period to determine if the first predetermined condition is satisfied extends to a fourth time point defining a point in time elapsed by a fourth predetermined length of time from the time point of engagement.

* * * * *